(12) United States Patent
Sakuta

(10) Patent No.: US 6,316,545 B1
(45) Date of Patent: Nov. 13, 2001

(54) OIL-IN-WATER EMULSION OF ORGANOPOLYSILOXANE AND METHOD FOR THE PREPARATION THEREOF

(75) Inventor: Koji Sakuta, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/465,747

(22) Filed: Dec. 17, 1999

(30) Foreign Application Priority Data

Dec. 18, 1998 (JP) .................................................. 10-360423

(51) Int. Cl.$^7$ .............................. C08L 83/00; B01F 3/08; A61K 7/06
(52) U.S. Cl. .............................. 524/837; 516/55; 516/69; 424/70.12; 510/119; 510/417
(58) Field of Search ..................... 516/55, 69; 524/837; 424/70.12, 70.11; 510/119, 417, 501

(56) References Cited

U.S. PATENT DOCUMENTS

| | | | |
|---|---|---|---|
| 4,824,602 | * | 4/1989 | Juneja ................................. 424/70.12 |
| 4,976,956 | * | 12/1990 | Noe ..................................... 424/70.12 |
| 5,482,703 | * | 1/1996 | Pings .................................. 424/70.12 |
| 5,556,615 | | 9/1996 | Janchitraponvej et al. ...... 424/70.11 |
| 5,788,884 | * | 8/1998 | Kutata et al. ...................... 516/67 |
| 5,972,356 | * | 10/1999 | Peffly et al. ..................... 424/70.12 |
| 5,973,066 | * | 10/1999 | Sakuta et al. ..................... 524/837 |
| 6,258,347 | * | 7/2001 | Sakuta et al. ..................... 424/70.12 |

FOREIGN PATENT DOCUMENTS

| | | |
|---|---|---|
| 0 798 332 A2 | 10/1997 | (EP) . |
| WO 95/23581 | 9/1985 | (WO) . |

OTHER PUBLICATIONS

Database file CA, AN–119:146352 vol. 119, #14, Oct. 4, 1993, JP 05–163122 A, abstract.
Database file CA, AN–127:8936, vol. 1, #1, Jul. 7, 1997, JP 09–71517A, abstract.

* cited by examiner

Primary Examiner—Daniel S. Metzmaier
(74) Attorney, Agent, or Firm—Millen, White, Zellano & Branigan, P.C.

(57) ABSTRACT

An oil-in-water aqueous emulsion of a high-viscosity organo-polysiloxane compound, which is suitable as an adjuvant in a hair-care treatment toiletry preparation, is disclosed. The emulsifier ingredient in the aqueous emulsion is a combination of a fatty acid amidoamine compound, e.g., dimethylaminopropyl stearamide, and an organic acid, e.g., lactic acid and amino acids, jointly forming a water-soluble fatty acid amidoamine salt compound having surface activity further in combination with a polyoxyalkylene-modified organopolysiloxane as a surface activity promoter.

19 Claims, No Drawings

OIL-IN-WATER EMULSION OF ORGANOPOLYSILOXANE AND METHOD FOR THE PREPARATION THEREOF

BACKGROUND OF THE INVENTION

The present invention relates to an oil-in-water aqueous emulsion of an organopolysiloxane compound and a method for the preparation thereof. More particularly, the invention relates to an aqueous emulsion of a high-viscosity organopolysiloxane compound of the oil-in-water type having usefulness as an adjuvant ingredient in toiletry preparations for hair-care treatment, polishing agents, mold-release agents, fabric-finishing agents and the like as well as to a method for the preparation of such an oil-in-water aqueous organopolysiloxane emulsion composition.

As is well known, organopolysiloxane compounds in the form of an aqueous emulsion are widely employed as an almost indispensable adjuvant in toiletry preparations for hair-care treatment, polishing agents, mold-release agents, fabric-finishing agents and the like. When an aqueous emulsion of an organopolysiloxane compound is employed as an adjuvant in a toiletry preparation for hair-care treatment, in particular, it is generally preferred that the organopolysiloxane compound has a relatively high viscosity or degree of polymerization in view of good adhesion of the high-viscosity organopolysiloxane compound to the hair as compared with low-viscosity organopolysiloxane compounds. Besides the viscosity of the organopolysiloxane compound, the particle diameter of the organopolysiloxane droplets as emulsified in an aqueous medium is another important parameter having significance on the performance of the toiletry preparation compounded with an aqueous organopolysiloxane emulsion. For example, a formulation of a shampoo composition is proposed in Japanese Patent Kokai 4-36226 and 4-224309 according to which a shampoo composition is admixed with an aqueous emulsion of an organopolysiloxane compound having a droplet diameter smaller than 2 μm in order not to unduly decrease the foamability of the shampoo composition. Further, Japanese Patent Kokai 63-130512, 5-13994 and 5-163122 each teach a method in which an organopolysiloxane compound is added to a hair-care treatment composition in the form of a so-called microemulsion as a much finer dispersion of the organopolysiloxane compound than in ordinary aqueous emulsions of the organopolysiloxane.

The above mentioned aqueous emulsion of an organopolysiloxane compound of which the particle diameter of the emulsion droplets is relatively small has a problem that the adhesive power of the organopolysiloxane droplets to the hair surface is so poor that the organopolysiloxane droplets once deposited on the hair surface are readily washed away by rinsing resulting in the loss of the hair-treatment effect. In this regard, a proposal is made in Japanese Patent Kokai 7-188557 for the use of an aqueous emulsion of an organopolysiloxane compound as an adjuvant to toiletry preparations, of which the organopolysiloxane droplets have a relatively large diameter in the range from 3 to 100 μm. Since the surface active agent used in the preparation of this organopolysiloxane emulsion is anionic, however, the organopolysiloxane emulsion is not always always suitable as an adjuvant to hair-care treatment compositions such as hair rinses, hair conditioners, hair treatments and the like formulated sometimes with a cationic surface active agent to cause phase separation or formation of precipitates although the organopolysiloxane emulsion is suitable as an adjuvant to a shampoo composition in which the surface active agent is almost always anionic.

In view of the problem of incompatibility of the surface active agents, a proposal is made in Japanese Patent Kokai 9-316331 for the use of a cationic surface active agent such as a quaternary ammonium salt compound in the preparation of an aqueous organopolysiloxane emulsion.

The surface active agent used in the preparation of an aqueous organopolysiloxane emulsion as an adjuvant in hair rinses, hair conditioners and hair treatments is not limited to cationic surface active agents but can be a fatty acid amidoamine salt compound which is compatible with anionic surface active agents. For example, a report is given in Journal of Society of Cosmetic Chemistry of Japan, Notes, volume 31, No. 1, pages 75–78 (1997) on the feasibility of an amphoteric surface active agent in a hair-rinse composition, according to which fatty acid amidoamine salt compounds are advantageous in respect of, besides the compatibility with anionic surface active agents, low irritativeness to the skin, little accumulation on the hair and mild rinsing effect. Although it would be a due idea accordingly to employ a fatty acid amidoamine salt compound as an emulsifying agent in the preparation of an aqueous emulsion of an organopolysiloxane having a high viscosity or degree of polymerization with an object to accomplish further improvements of a hair-care treatment composition relative to the gloss and lubricity of the treated hair and hair-protecting effect under full utilization of the above mentioned various features of the compound, an attempt according to this idea, however, is unsuccessful and a fully stable aqueous emulsion of a high-viscosity or high-polymerization organopolysiloxane compound cannot be obtained due to the relatively low emulsifying activity of fatty acid amidoamine salt compounds in general.

SUMMARY OF THE INVENTION

The present invention accordingly has an object to provide a fully stable oil-in-water aqueous emulsion of an organopolysiloxane compound having a relatively high viscosity or degree of polymerization prepared by emulsification with a fatty acid amidoamine salt compound having little irritativeness to the skin as an emulsifying agent.

Thus, the oil-in-water aqueous emulsion composition of an organopolysiloxane compound provided by the present invention comprises:

(A) 100 parts by weight of an organopolysiloxane compound having a viscosity of at least 10,000 mm$^2$/s at 25° C. and expressed by the average unit formula

$$R^1_a SiO_{(4-a)/2}, \quad (I)$$

in which the groups denoted by $R^1$ are, each independently from the others, an unsubstituted or substituted monovalent hydrocarbon group having 1 to 20 carbon atoms and the subscript a is a positive number in the range from 1.8 to 2.2;

(B) from 0.1 to 10 parts by weight of a fatty acid amidoamine compound represented by the general formula

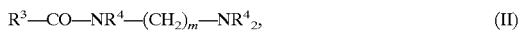

$$R^3-CO-NR^4-(CH_2)_m-NR^4_2, \quad (II)$$

in which $R^3$ is a monovalent hydrocarbon group having 15 to 19 carbon atoms, each $R^4$ is, independently from the others, a hydrogen atom or a monovalent hydrocarbon group having 1 to 5 carbon atoms and the subscript m is a positive integer of 2, 3 or 4;

(C) from 0.05 to 5 parts by weight of an organic acid;

(D) from 0.05 to 10 parts by weight of a polyoxyalkylene-modified organopolysiloxane compound having a molecular weight not exceeding 3000 and expressed by the average unit formula $$R^2_b R^5_c SiO_{(4-b-c)/2}, \quad (III)$$

in which the groups denoted by $R^2$ are, each independently from the others, a monovalent hydrocarbon group having 1 to 20 carbon atoms, the groups denoted by $R^5$ are, each independently from the others, a polyoxyalkylene-substituted alkyl group represented by the general formula $$-(C_dH_{2d})-O-(C_2H_4O)_e-(C_3H_6O)_f-R^6, \quad (IIIa)$$

$R^6$ being a hydrogen atom, a monovalent hydrocarbon group having 1 to 20 carbon atoms or an acyl group having 2 to 20 carbon atoms, the subscript d being a positive integer of 2 to 15, the subscript e being a positive integer of 3 to 200 and the subscript f being 0 or a positive integer not exceeding 100 with the proviso that e+f is in the range from 3 to 200, the subscript b is a positive number in the range from 1.0 to 2.5 and the subscript c is a positive number in the range from 0.005 to 1.2 with the proviso that b+c is in the range from 1.5 to 2.8; and (E) from 10 to 300 parts by weight of water as a dispersion medium of the components (A) to (D).

It is preferable in the above described formulation of the inventive emulsion composition that the polyoxyalkylene-modified organopolysiloxane compound as the component (D) has an HLB value of 7 or higher and exhibits such a surface activity that a 0.1% by weight aqueous solution thereof has a surface tension not exceeding 30 mN/m at 25° C.

It is optional in the above described formulation of the inventive emulsion composition that the amount of the component (A) is decreased to 10 to 99 parts by weight and the balance to 100 parts by weight is replaced with:

(A1) a second organopolysiloxane compound having a viscosity in the range from 2 to 1000 mm²/s at 25° C. and expressed by the average unit formula $$R^1_{a'} SiO_{(4-a')/2}, \quad (IV)$$

in which $R^1$ has the same meaning as defined for the average unit formula (I) expressing the component (A) and the subscript a' is a positive number in the range from 1.8 to 2.2; or (A2) a liquid hydrocarbon compound having a boiling point in the range from 60 to 260° C. under normal pressure.

It is preferable that the component (A) and component (A1) are combined in a weight proportion in the range from 10:90 to 90:10 assuming that the high-viscosity organopolysiloxane compound as the component (A) has a viscosity of at least 100,000 mm²/s at 25° C.

The above defined oil-in-water aqueous organopolysiloxane emulsion of the invention can be prepared by a method which comprises the steps of:

(a) mixing together 100 parts by weight of the component (A), from 0.1 to 10 parts by weight of the component (B), from 0.05 to 5 parts by weight of the component (C), from 0.05 to 10 parts by weight of the component (D) and from 1 to 20 parts by weight of water as a part of the component (E), each component being defined above, under agitation to form a water-in-oil emulsion;

(b) further agitating the water-in-oil emulsion to effect phase inversion thereof into an oil-in-water emulsion; and (c) optionally, diluting the oil-in-water emulsion by the addition of water to make up a total amount of water as the component (E) in the range from 10 to 300 parts by weight.

DETAILED DESCRIPTION OF THE PREFERRED EMBODIMENTS

As is understood from the above given description, the principal ingredient to form the dispersed phase of the inventive oil-in-water aqueous emulsion composition is the component (A) which is a high-viscosity organopolysiloxane expressed by the average unit formula (I). In this average unit formula, the group denoted by $R^1$ is a monovalent hydrocarbon group having 1 to 20 carbon atoms exemplified by alkyl groups such as methyl, ethyl, propyl, butyl, pentyl, hexyl, heptyl, octyl, nonyl, decyl, dodecyl, tetradecyl, hexadecyl and octadecyl groups, aryl groups such as phenyl and tolyl groups and cycloalkyl groups such as cyclopentyl and cyclohexyl groups. These monovalent hydrocarbon groups or, in particular, alkyl groups can be substituted for a part or all of the hydrogen atoms by various substituent atoms and/or groups including halogen atoms and amino, epoxy, mercapto, acryloxy, methacryloxy, acyloxy, carboxyl and hydroxyl groups. Examples of the halogen- and amino-substituted alkyl groups include 3,3,3-trifluoropropyl, 2-(perfluorobutyl)ethyl, 2-(perfluorooctyl)ethyl, 3-aminopropyl and 3-N-(2-aminoethyl)aminopropyl groups. It is preferable that the groups denoted by $R^1$ are selected from methyl, phenyl and amino-substituted alkyl groups although it is more preferable that all or at least 80% by moles thereof are methyl groups, the balance, if any, being amino-substituted alkyl groups.

In order to accomplish good adhesion to the hair treated with the hair-care treatment composition compounded with the inventive organopolysiloxane emulsion, the high-viscosity organopolysiloxane compound as the component (A) should have a viscosity at 25° C. of at least 10,000 mm²/s or, preferably, at least 100,000 mm²/s or, more preferably, at least 1,000,000 mm²/s.

As is stated above, the high-viscosity organopolysiloxane compound as the component (A) can be partially replaced with a low-viscosity organopolysiloxane compound as the component (A1) or a specific liquid hydrocarbon compound as the component (A2), which serves as a diluent of the high-viscosity organopolysiloxane compound as the component (A) to facilitate emulsification thereof in an aqueous medium. The low-viscosity organopolysiloxane as the component (A1) should have a viscosity in the range from 2 to 1000 mm²/s or, preferably, from 10 to 500 mm²/s at 25° C. When the viscosity thereof is too low, irritativeness of the emulsion composition to the human skin is increased so as to decrease the feasibility of the emulsion composition as an adjuvant to toiletry preparations. When the viscosity thereof is too high, miscibility of the low-viscosity organopolysiloxane as the component (A1) with the component (A) is decreased. The molecular structure of the low-viscosity organopolysiloxane compound as the component (A1) is not particularly limitative including linear and cyclic structures. Examples of low-viscosity organopolysiloxane compounds having a cyclic molecular structure suitable as the component (A1) include hexamethyl cyclotrisiloxane, octamethyl cyclotetrasiloxane, decamethyl cyclopentasiloxane, dodecamethyl cyclohexasiloxane, 1,3,5-tri(3,3,3-trifluoropropyl)-1,3,5-trimethyl cyclotrisiloxane, 1,3,5,7-tetra(3,3,3-trifluoropropyl)-1,3,5,7-tetramethyl cyclotetrasiloxane and 1,3,5,7,9-penta(3,3,3-trifluoropropyl)-1,3,5,7,9-pentamethyl cyclopentasiloxane, of which octamethyl cyclotetrasiloxane and decamethyl cyclopentasiloxane are preferable. Among the linear organopolysiloxane compounds, dimethylpolysiloxanes having a viscosity in the range from 10 to 500 mm²/s at 25° C. are particularly preferable.

The liquid hydrocarbon compound as the component (A2), which is alternative to the component (A1), should have a boiling point in the range from 60 to 260° C. under normal pressure. Liquid hydrocarbon compounds having a boiling point lower than 60° C. generally have a strong unpleasant odor not to be suitable for an ingredient in a toiletry preparation. On the other hand, those having a boiling point higher than 260° C. generally have poor miscibility with the high-viscosity organopolysiloxane as the component (A) not to be suitable as a diluent thereof. Various commercial products of petroleum-based hydrocarbon solvents available on the market are suitable as the component (A2) including those sold under the trade names of Isopars C, E, G, H, L and M (each a product by Exxon Co.), IP Solvents 1016, 1620 and 2028 (each a product by Idemitsu Petrochemical Co.), Marucasol R (a product by Maruzen Petrochemical Co.), Nisseki Isosols 300 and 400 (each a product by Nippon Petrochemical Co.), Shellsol 71 (a product by Shell Chemical Co.), Soltols 100, 130 and 220 (each a product by Philips Co.) and Isohexadecane (a product by Bayer Japan Co.).

The component (B) in the inventive aqueous emulsion composition is a fatty acid amidoamine compound represented by the general formula (II) which is a compound derived from a fatty acid such as palmitic, stearic and eicosanoic acids. In the general formula (II), the group denoted by $R^3$ is a monovalent hydrocarbon group or alkyl group having 15 to 19 carbon atoms such as pentadecyl and heptadecyl groups. These monovalent hydrocarbon groups can be substituted for a part or all of the hydrogen atoms by substituent atoms and/or groups such as halogen atoms, cyano groups, amino groups, epoxy groups, mercapto groups, acryloxy groups, methacryloxy groups, acyloxy groups, carboxyl groups, hydroxyl groups and alkoxy groups. $R^4$ in the general formula (II) is a hydrogen atom or a monovalent hydrocarbon group or, in particular, alkyl group having 1 to 5 carbon atoms such as methyl, ethyl, propyl, butyl and pentyl groups. The subscript m in the general formula (11) is a positive integer of 2, 3 or 4 or, preferably, 2 or 3.

Particular examples of the fatty acid amidoamine compounds suitable as the component (B) include aminoethyl palmitamide, aminopropyl palmitamide, dimethylaminoethyl palmitamide, dimethylaminopropyl palmitamide, diethylaminoethyl palmitamide, diethylaminopropyl palmitamide, aminoethyl stearamide, aminopropyl stearamide, dimethylaminoethyl stearamide, dimethylaminopropyl stearamide, diethylaminoethyl stearamide, diethylaminopropyl stearamide, aminoethyl eicosanamide, aminopropyl eicosanamide, dimethylaminoethyl eicosanamide, dimethylaminopropyl eicosanamide, diethylaminoethyl eicosanamide and diethylaminopropyl eicosanamide, of which dimethylaminoethyl stearamide, dimethylaminopropyl stearamide, diethylaminoethyl stearamide and diethylaminopropyl stearamide are preferable.

The component (C) in the inventive aqueous emulsion composition is an organic acid exemplified by mono- and dicarboxylic acids such as citric acid, glycolic acid, succinic acid, acetic acid, oxalic acid, tartaric acid, lactic acid, fumaric acid, propionic acid, valeric acid, hexanoic acid, maleic acid, butyric acid and malic acid and amino acids such as asparagine, aspartic acid, aminobutyric acid, alanine, arginine, glycine, glutamine, glutamic acid, sarcosine, cystine, cysteine, cysteic acid, serine, taurine, threonin, valine, methionine, lysine, leucine and proline, of which amino acids are preferable and aspartic acid, glutamic acid, alanine and serine are more preferable.

The fatty acid amidoamine compound as the component (B) and the organic acid as the component (C) must be contained in the inventive aqueous emulsion composition in a molar proportion in the range from 1:5 to 5:1 or, preferably, from 1:3 to 3:1. When the molar proportion of these ingredients deviates out of the range, formation of a water-soluble salt of the fatty acid amidoamine compound would be incomplete to leave a large amount of the component (B) or (C) as such.

The component (D) in the inventive aqueous emulsion composition is a polyoxyalkylene-modified organopolysiloxane which is indispensable as a promoter for the surface activity exhibited by the fatty acid amidoamine salt compound. When the component (D) is omitted in the formulation of the aqueous emulsion composition, full and stable emulsification of the high-viscosity organopolysiloxane as the component (A) can hardly be accomplished because the emulsifying effect there is afforded only by the fatty acid amidoamine compound as the component (B) and the organic acid as the component (C) jointly forming a salt of which the surface activity is relatively low.

The polyoxyalkylene-modified organopolysiloxane as the component (D) is expressed by the average unit formula $R^2_b R^5_c SiO_{(4-b-c)/2}$, in which the subscript b is a positive number in the range from 1.0 to 2.5 or, preferable, from 1.2 to 2.3, the subscript c is a positive number in the range from 0.005 to 1.2 or, preferably, from 0.01 to 1.0 with the proviso that b+c is in the range from 1.5 to 2.8, $R^2$ is a monovalent hydrocarbon group having 1 to 20 carbon atoms and $R^5$ is a polyoxyalkylene-substituted alkyl group represented by the general formula

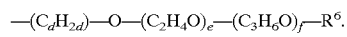

$$—(C_dH_{2d})—O—(C_2H_4O)_e—(C_3H_6O)_f—R^6.$$

In this general formula representing $R^5$, the subscript d is a positive integer in the range from 2 to 15 or, preferably, from 3 to 12, the subscript e is a positive integer in the range from 3 to 200 or, preferably, from 5 to 100 with the proviso that e+f is in the range from 3 to 200, the subscript f is 0 or a positive integer not exceeding 100 and $R^6$ is a hydrogen atom, a monovalent hydrocarbon group having 1 to 20 carbon atoms or an acyl group having 2 to 20 carbon atoms. The monovalent hydrocarbon group denoted by $R^6$ is exemplified by alkyl groups such as methyl, ethyl, propyl, butyl, pentyl, hexyl, heptyl, octyl, nonyl, decyl, dodecyl, tetradecyl, hexadecyl and octadecyl groups, aryl groups such as phenyl and tolyl groups and cycloalkyl groups such as cyclopentyl and cyclohexyl groups.

Since the groups $R^2$ and $R^5$ impart hydrophobicity and hydrophilicity, respectively, to the organopolysiloxane as the component (D), the balance between the contents of the groups $R^2$ and $R^5$ is an important factor for the performance of the component (D) as a surface activity promoter. When the content of the groups $R^2$ is too low relative to the groups $R^5$, the component (D) is overly hydrophilic to have a decreased dispersibility in the high-viscosity organopolysiloxane as the component (A) not to exhibit high performance as a surface activity promoter. Similarly, the performance of the polyoxyalkylene-modified organopolysiloxane as a surface activity promoter is decreased when the content of the groups $R^2$ is too high relative to the groups $R^5$ due to unduly low hydrophilicity. When the subscript e in the general formula for $R^5$ is smaller than 3, the organopolysiloxane cannot be imparted with high hydrophilicity. Besides, it is preferable that the value of the subscript e in the general formula representing $R^5$ is larger than the value of the subscript f in order to impart adequate water-solubility to the component (D).

The polyoxyalkylene-modified organopolysiloxane as the component (D) has a molecular structure which may be linear, branched or cyclic. It is important that the polyoxyalkylene-modified organopolysiloxane has a molecular weight not exceeding 3000 and an HLB value of 7 or higher. When the molecular weight thereof is too large, the organopolysiloxane is poor in respect of the dispersibility in the high-viscosity organopolysiloxane compound as the component (A) while, when the HLB value is too low, the solubility of the organopolysiloxane in water is decreased leading to a decrease in the surface activity promoting power. In this regard, the polyoxyalkylene-modified organopolysiloxane as the component (D) is characterized by the surface tension of an aqueous solution thereof that a 0.1% by weight aqueous solution has a surface tension not exceeding 30 mN/m at 25° C.

It is of course possible to obtain an oil-in-water aqueous emulsion of a high-viscosity organopolysiloxane compound by using certain water-soluble modified organopolysiloxane compounds other than the polyoxyalkylene-modified organopolysiloxane as the component (D) although the type of the water-soluble silicone compounds is limited. When the water-soluble silicone compound has an anionic organic group such as a sulfate ester group in the molecule, for example, the silicone compound forms a complex compound with the fatty acid amidoamine compound as the component (B) not to exhibit full surface activity promoting effect leading to failure in obtaining a stable emulsion composition. When the silicone compound has a quaternary ammonium salt-based organic group as the modifying group in the molecule, good hydrophilicity of the silicone compound can be obtained only with a high degree of modification and, when a hair-care treatment composition is prepared by formulating with a quaternary ammonium-modified silicone compound of low degree of modification, the hair after treatment with the hair-care treatment composition has a problem of stickiness in touch feeling. A water-soluble silicone compound modified with glycerin- or polyglycerin-based groups is also undesirable because of stickiness of the hair after treatment with a hair-care treatment composition formulated therewith.

The amount of water as the component (E) to serve as a dispersion medium of the components (A) to (D) described above to form an aqueous emulsion is in the range from 10 to 300 parts by weight or, preferably, from 20 to 100 parts by weight per 100 parts by weight of the high-viscosity organopolysiloxane as the component (A). When the amount of water is too small, difficulties are encountered in handling of the emulsion composition due to an undue increase in the viscosity or consistency of the emulsion composition while, when the amount of water is too large, a decrease is caused in the storage stability of the aqueous emulsion composition.

The oil-in-water aqueous organopolysiloxane emulsion composition of the invention can be prepared by a method described below. Namely, in step (a), a mixture consisting of 100 parts by weight of the component (A), 0.1 to 10 parts by weight of the component (B), 0.05 to 5 parts by weight of the component (C), 0.05 to 10 parts by weight of the component (D) and 1 to 20 parts by weight of water as a part of the component (E) is agitated to form a water-in-oil emulsion which is, by further continued agitation in step (b), converted into an oil-in-water emulsion by phase inversion followed, in step (c), if necessary, by dilution of the oil-in-water emulsion with water, which optionally contains the components (B) and (C) dissolved therein, in an amount to make up a total amount of water not smaller than 10 parts by weight but not exceeding 300 parts by weight. When the amount of water initially taken as a part of the component (E) is smaller than 0.1 part by weight, the phenomenon of phase inversion from a water-in-oil emulsion to an oil-in-water emulsion can hardly take place while, when the amount thereof is too large, the aqueous emulsion prepared herewith suffers a problem that the hair exhibits stickiness after treatment with a hair-care treatment composition formulated with the aqueous emulsion composition.

The fatty acid amidoamine compound as the component (B) and the organic acid as the component (C) jointly form a fatty acid amidoamine salt compound which acts as an emulsifying agent to form the aqueous organopolysiloxane emulsion composition of the invention. When the amount of the component (C) is too small, the amount of the fatty acid amidoamine salt compound formed therefrom is correspondingly too small to exhibit a full emulsifying effect while, when the amount thereof is too large, the stability of the emulsion composition is decreased. When the amount of the component (D), i.e. the polyoxyalkylene-modified organopolysiloxane compound, is too small, no stable aqueous emulsion is obtained due to deficiency in the surface-activity promoting effect. When the amount of the component (D) is too large, on the other hand, a difficulty is encountered in controlling the particle size distribution of the organopolysiloxane droplets in the aqueous emulsion composition due to an excessively high surface-activity promoting effect. When the amount of water used in step (a) is too small, the water-in-oil emulsion formed in step (a) cannot be converted into an oil-in-water emulsion even by continuing agitation in step (b) so that the desired inventive oil-in-water aqueous emulsion composition cannot be obtained. Use of a too large amount of water in step (a) leads to an excessively large particle diameter of the organopolysiloxane droplets exceeding 20 $\mu$m to greatly decrease stability of the oil-in-water aqueous emulsion composition of the high-viscosity organopolysiloxane compound.

When the above described preparation procedure is adequately undertaken according to the above given description, the organopolysiloxane droplets in the inventive oil-in-water aqueous emulsion composition have an average particle diameter in the range from 0.5 to 20 $\mu$m or, desirably, from 1 to 15 $\mu$m although it is rarely the case that the average particle diameter is smaller than 0.5 $\mu$m because the emulsifying power of the fatty acid amidoamine salt compound formed from the components (B) and (C) is not so strong as to produce emulsion droplets finer than 0.5 $\mu$m. When the emulsion droplets are too coarse, the hair-care treatment composition admixed with the aqueous organopolysiloxane emulsion suffers a decrease in the stability.

Though not particularly limitative, the emulsifier machine used in the preparation of the aqueous organopolysiloxane emulsion should be of the high-shear agitation type including the emulsifier machines sold under the trade names of Ultra Mixers, Planetary Mixers, Combi Mixers, Pipeline Homomixers, Homomic Line Mills, Filmixes and others. It is important in the preparation method of the inventive aqueous organopolysiloxane emulsion composition that the phase inversion of the emulsion in step (b) from the water-in-oil type to the oil-in-water type is followed by further continuing agitation preferably for 20 minutes to 3 hours. When this length of time for further agitation of the emulsion is too short, the particle size distribution of the emulsion droplets is somewhat broadened resulting in a decrease in the stability of the aqueous emulsion while, when this length of time is too long, the emulsion droplets after the phase inversion are broken down leading to phase separation of the emulsion into oily and aqueous phases after dilution with water in step (c).

In contrast to the above described method for the preparation of the inventive oil-in-water organopolysiloxane emulsion composition, similar emulsion compositions are prepared in the prior art by a method in which a high-viscosity organopolysiloxane compound corresponding to the component (A) is emulsified in an aqueous medium by using a non-ionic surface active agent which is typically a polyoxyethylene alkyl ether in combination with a fatty acid amidoamine compound and an organic acid corresponding to the components (B) and (C), respectively. Alternatively, a high-viscosity organopolysiloxane compound corresponding to the component (A) is emulsified in an aqueous medium by using a non-ionic surface active agent which is typically a polyoxyethylene alkyl ether followed by dilution with water together with addition of a fatty acid amidoamine compound and an organic acid corresponding to the components (B) and (C), respectively.

As compared with a hair-care treatment composition formulated with the inventive organopolysiloxane emulsion composition, hair-care treatment compositions formulated with the above described prior art emulsion composition are defective in respect of insufficient adhesion of the organopolysiloxane to the hair presumably as a consequence of the use of a conventional non-ionic surface active agent. Accordingly, it is undesirable that the inventive organopolysiloxane emulsion composition is admixed with a non-ionic surface active agent other than the polyoxyalkylene-modified organopolysiloxane as the component (D), betaine-based amphoteric surface active agent or anionic surface active agent although a variety of additives can optionally be added to the emulsion including polyhydric alcohols, thickening agents, antiseptic agents, perfumes, dyes, pigments and the like each in a limited amount. In order to prevent the emulsion composition from having an unduly increased viscosity or pasty consistency at low temperatures to cause inconvenience in handling, it is optional to admix the emulsion composition with an alcohol such as ethyl alcohol, 2-propanol and butyl alcohol in an amount not to exceed 10 parts by weight per 100 parts by weight of the component (A).

In the following, the present invention is illustrated in more detail by way of Examples and Comparative Examples, which, however, never limit the scope of the invention in any way. In the following description, the term of "parts" always refers to "parts by weight" and the values of viscosity of the ingredients and mixtures are all those obtained by the measurements at 25° C.

In the formulations of the organopolysiloxane emulsion compositions described below, four kinds of organopolysiloxane mixtures, referred to as OPS Mix-1 to OPS Mix-4 hereinafter, as characterized below were employed for emulsification.

OPS Mix-1: a uniform mixture of 800,000 mm$^2$/s viscosity consisting of 40 parts of a high-viscosity dimethylpolysiloxane having a viscosity of 20,000,000 mm$^2$/s and 60 parts of a low-viscosity dimethylpolysiloxane having a viscosity of 20 mm$^2$/s OPS Mix-2: a uniform mixture of 1,000,000 mm$^2$/s viscosity consisting of 50 parts of a high-viscosity methylphenylpolysiloxane having a viscosity of 15,000,000 mm$^2$/s, of which the content of phenyl groups was 5% by moles of the organic groups, and 50 parts of a low-viscosity dimethylpolysiloxane having a viscosity of 200 mm$^2$/s OPS Mix-3: a uniform mixture of 20,000 mm$^2$/s viscosity consisting of 20 parts of a high-viscosity amino-modified dimethylpolysiloxane having a viscosity of 30,000,000 mm$^2$/s, of which the content of the amino groups in the form of 3-aminopropyl groups corresponded to an amino equivalent of 700,000 g/mole, and 80 parts of a low-viscosity dimethylpolysiloxane having a viscosity of 10 mm$^2$/s OPS Mix-4: a uniform mixture of 10,000 mm$^2$/s viscosity consisting of 20 parts of a high-viscosity dimethylpolysiloxane having a viscosity of 10,000,000 mm$^2$/s and 80 parts of decamethyl cyclopentasiloxane having a viscosity of 4.0 mm$^2$/s The organopolysiloxane emulsions prepared in Examples and Comparative Examples described below were formulated without or with one of five kinds or polyoxyalkylene-modified organopolysiloxanes, referred to as POASi-1 to POASi-5 hereinafter, which were characterized in terms of the general structural formula

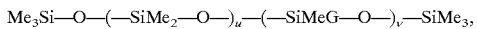

In which Me is a methyl group and the group denoted by G is a group represented by the general formula

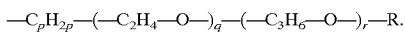

Table 1 below summarizes the values of the subscripts u, v, p, q and r and the type of the group denoted by R in the above given formulas along with the molecular weight, HLB value and surface tension of a 0.1% by weight aqueous solution of the organopolysiloxane at 25° C. for each of the POASi-1 to -5.

TABLE 1

|  | POASi-1 | POASi-2 | POASi-3 | POASi-4 | POASi-5 |
| --- | --- | --- | --- | --- | --- |
| u | 0 | 4 | 2 | 10 | 10 |
| v | 1 | 2 | 4 | 5 | 5 |
| p | 3 | 3 | 11 | 3 | 3 |
| q | 6 | 10 | 8 | 10 | 20 |
| r | 0 | 0 | 0 | 2 | 0 |
| R | CH$_3$ | H | H | C$_4$H$_9$ | H |
| Molecular weight | 558 | 1,574 | 2,638 | 4,552 | 5,892 |
| HLB | 9.5 | 11.2 | 10.7 | 9.7 | 14.9 |
| Surface tension, mN/m | 20.6 | 24.0 | 26.5 | 28.0 | 32.0 |

EXAMPLE 1

A mixture composed of 100 parts of a dimethylpolysiloxane oil having a viscosity of 50,000 mm$^2$/s, 1.0 part of dimethylaminopropyl stearamide, 0.4 part of L-glutamic acid, 1.5 parts of POASi-1 and 5.3 parts of water was introduced into a stainless-steel composite emulsifying machine of 5-liter capacity (Model TK Combi Mix M, manufactured by Tokushu Kika Kogyo Co.), which was equipped with an anchor-blade stirrer and a high-shear loading unit having a disk-type agitator provided with upward and downward teeth alternately protruded on the respective peripheries of the lower and upper disks and agitated in the emulsifier vessel by concurrently rotating the anchor-blade stirrer at 40 rpm and the disk agitator at 1500 rpm for 1 hour so that the water-in-oil emulsion initially formed in the emulsifier vessel was converted into an oil-in-water emulsion by phase inversion. This emulsion as contained in the emulsifier vessel was diluted by adding 60.0 parts of water under agitation with the anchor-blade stirrer rotated at the same velocity and the disk agitator stopped to obtain an oil-in-water aqueous emulsion of the organopolysiloxane compound according to the invention.

Evaluation of the thus prepared oil-in-water emulsion composition was made by measuring the average particle diameter of the organopolysiloxane droplets using a Coulter Counter, Model TA (trade name, manufactured by Coulter Electronics Co.) and by visually inspecting the condition of the emulsion after storage of a 100 g portion of the emulsion in a stoppered glass bottle at 45° C. for one month to record the results in three ratings of Good, Fair and Poor when absolutely no phase separation was noted, when a slight degree of phase separation was noted and when phase separation was complete into two phases, respectively. The results are shown in Table 2 below.

EXAMPLE 2

The procedure for the preparation and evaluation of an oil-in-water emulsion composition was substantially the same as in Example 1 except that the initial charge to the emulsifier vessel consisted of 100 parts of the OPS Mix-1, 0.5 part of dimethylaminopropyl stearamide, 0.2 part of L-glutamic acid, 1.5 parts of POASi-1 and 2.7 parts of water.

The results of the evaluation tests of the emulsion composition are shown in Table 2.

EXAMPLE 3

The procedure for the preparation and evaluation of an oil-in-water emulsion composition was substantially the same as in Example 2 excepting for a decrease of the amount of POASi-1 from 1.5 parts to 0.8 part.

The results of the evaluation tests of the emulsion composition are shown in Table 2.

Comparative Example 1

The procedure for the preparation and evaluation of an oil-in-water emulsion composition was substantially the same as in Example 1 excepting for omission of POASi-1 in the formulation.

The results of the evaluation tests of the emulsion composition are shown in Table 2.

Comparative Example 2

A procedure for the preparation of an oil-in-water emulsion composition, which was substantially the same as that in Example 2, was undertaken excepting for omission of POASi-1 in the formulation.

In this case, however, the desired oil-in-water emulsion composition could not be obtained due to failure of phase inversion to an oil-in-water emulsion from the initially formed water-in-oil emulsion even by prolonged agitation thereof.

EXAMPLE 4

The procedure for the preparation and evaluation of an oil-in-water emulsion composition was substantially the same as in Example 1 except that the initial charge to the emulsifier vessel consisted of 100 parts of the OPS Mix-2, 2.3 parts of diethylaminoethyl stearamide, 0.5 part of lactic acid, 1.4 parts of POASi-2 and 11.0 parts of water and the amount of water for dilution of the oil-in-water emulsion was 28.0 parts instead of 60.0 parts.

The results of the evaluation tests of the emulsion composition are shown in Table 2.

EXAMPLE 5

The procedure for the preparation and evaluation of an oil-in-water emulsion composition was substantially the same as in Example 4 except that the initial charge to the emulsifier vessel consisted of 100 parts of the OPS Mix-3, 1.9 parts of diethylaminoethyl stearamide, 0.4 part of lactic acid, 2.5 parts of POASi-3 and 9.0 parts of water and that the amount of water for dilution of the oil-in-water emulsion was 30.0 parts instead of 28.0 parts.

The results of the evaluation tests of the emulsion composition are shown in Table 2.

EXAMPLE 6

The procedure for the preparation and evaluation of an oil-in-water emulsion composition was substantially the same as in Example 5 excepting for the replacement of the OPS Mix-3 with the same amount of the OPS Mix-2 and a decrease in the amount of POASi-3 from 2.5 parts to 1.4 parts.

The results of the evaluation tests of the emulsion composition are shown in Table 2.

Comparative Example 3

The procedure for the preparation and evaluation of an oil-in-water emulsion composition was substantially the same as in Example 6 excepting for an increase of the amount of water in the initial charge to the emulsifier vessel from 9.0 parts to 25.0 parts.

The results of the evaluation tests of the emulsion composition are shown in Table 2.

EXAMPLE 7

The procedure for the preparation and evaluation of an oil-in-water emulsion composition was substantially the same as in Example 1 except that the initial charge to the emulsifier vessel consisted of 100 parts of the OPS Mix-4, 2.0 parts of diethylaminoethyl stearamide, 0.5 part of L-alanine, 2.0 parts of POASi-1 and 9.6 parts of water and that the amount of water for dilution of the oil-in-water emulsion was 86.0 parts instead of 60.0 parts.

The results of the evaluation tests of the emulsion composition are shown in Table 2.

EXAMPLE 8

The procedure for the preparation and evaluation of an oil-in-water emulsion composition was substantially the same as in Example 1 excepting for an increase of the amount of POASi-1 from 2.0 parts to 4.0 parts.

The results of the evaluation tests of the emulsion composition are shown in Table 2.

Comparative Example 4

The procedure for the preparation and evaluation of an oil-in-water emulsion composition was substantially the same as in Example 7 excepting for the replacement of POASi-1 with the same amount of POASi-4.

The results of the evaluation tests of the emulsion composition are shown in Table 2.

Comparative Example 5

The procedure for the preparation and evaluation of an oil-in-water emulsion composition was substantially the same as in Example 7 excepting for the replacement of POASi-1 with the same amount of POASi-5.

The results of the evaluation tests of the emulsion composition are shown in Table 2.

TABLE 2

|  |  | Average particle diameter, μm | Stability of emulsion |
|---|---|---|---|
| Example | 1 | 6.1 | Good |
|  | 2 | 5.7 | Good |
|  | 3 | 6.5 | Good |
|  | 4 | 15.2 | Good |
|  | 5 | 8.3 | Good |
|  | 6 | 14.0 | Good |
|  | 7 | 9.8 | Good |
|  | 8 | 0.8 | Good |
| Comparative Example | 1 | 35.2 | Poor |
|  | 2 | — | — |
|  | 3 | 42.0 | Poor |
|  | 4 | 12.3 | Fair |
|  | 5 | 34.0 | Poor |

What is claimed is:

1. An oil-in-water aqueous emulsion composition of an organopolysiloxane compound which comprises:

(A) 100 parts by weight of an organopolysiloxane compound having a viscosity of at least 10,000 mm$^2$/s at 25° C. and expressed by the average unit formula $$R^1_a SiO_{(4-a)/2},$$

in which the groups denoted by $R^1$ are, each independently from the others, a monovalent hydrocarbon group having 1 to 20 carbon atoms and the subscript a is a positive number in the range from 1.8 to 2.2;

(B) from 0.1 to 10 parts by weight of a fatty acid amidoamine compound of the formula $$R^3\text{—CO—}NR^4\text{—}(CH_2)_m\text{—}NR^4_2,$$

in which $R^3$ is a monovalent hydrocarbon group having 15 to 19 carbon atoms, each $R^4$ is, independently from the others, a hydrogen atom or a monovalent hydrocarbon group having 1 to 5 carbon atoms and the subscript m is a positive integer of 2, 3 or 4;

(C) from 0.05 to 5 parts by weight of an amino acid;

(D) from 0.05 to 10 parts by weight of a polyoxyalkylene-modified organopolysiloxane compound having a molecular weight not exceeding 3000 and expressed by the average unit formula $$R^2_b R^5_c SiO_{(4-b-c)/2},$$

in which the groups denoted by $R^2$ are, each independently from the others, a monovalent hydrocarbon group having 1 to 20 carbon atoms, the groups denoted by $R^5$ are, each independently from the others, a polyoxyalkylene-substituted alkyl group of the formula $$\text{—}(C_dH_{2d})\text{—O—}(C_2H_4O)_e\text{—}(C_3H_6O)_f\text{—}R^6,$$

$R^6$ being a hydrogen atom, a monovalent hydrocarbon group having 1 to 20 carbon atoms or an acyl group having 2 to 20 carbon atoms, the subscript d being a positive integer of 2 to 15, the subscript e being a positive integer of at least 3 and the subscript f being 0 or a positive integer, the subscript b is a positive number in the range from 1.0 to 2.5 and the subscript c is a positive number in the range from 0.005 to 1.2 with the proviso that b+c is in the range from 1.5 to 2.8; and (E) from 10 to 300 parts by weight of water as a dispersion medium of the components (A) to (D);

wherein components (B) and (C) together form at least some fatty acid amidoamine-amino acid salt, and wherein droplets in the emulsion have an average diameter in the range from 0.5 to 20 μm.

2. The oil-in-water aqueous emulsion composition of an organopolysiloxane compound as claimed in claim 1 in which the group denoted by $R^1$ in the average unit formula expressing the component (A) is selected from the group consisting of alkyl groups, aryl groups and cycloalkyl groups unsubstituted or substituted for a part or all of the hydrogen atoms by substituents selected from the group consisting of halogen atoms, amino groups, epoxy groups, mercapto groups, acryloxy groups, methacryloxy groups, acyloxy groups, carboxyl groups, hydroxyl groups and alkoxy groups.

3. The oil-in-water aqueous emulsion composition of an organopolysiloxane compound as claimed in claim 2 in which at least 80% by moles of the groups denoted by $R^1$ in the component (A) are methyl groups, the balance, if any, being amino-substituted alkyl groups.

4. The oil-in-water aqueous emulsion composition of an organopolysiloxane compound as claimed in claim 1 in which the organopolysiloxane as the component (A) has a viscosity of at least 100,000 mm$^2$/s at 25° C.

5. The oil-in-water aqueous emulsion composition of an organopolysiloxane compound as claimed in claim 1 in which the fatty acid amidoamine compound as the component (B) is an amidoamine compound of a fatty acid selected from the group consisting of palmitic acid, stearic acid and eicosanoic acid.

6. The oil-in-water aqueous emulsion composition of an organopolysiloxane compound as claimed in claim 5 in which the subscript m in the formula representing the fatty acid amidoamine compound as the component (B) is 2 or 3.

7. The oil-in-water aqueous emulsion composition of an organopolysiloxane compound as claimed in claim 6 in which the fatty acid amidoamine compound as the component (B) is selected from the group consisting of aminoethyl palmitamide, aminopropyl palmitamide, dimethylaminoethyl palmitamide, dimethylaminopropyl palmitamide, diethylaminoethyl palmitamide, diethylaminopropyl palmitamide, aminoethyl stearamide, aminopropyl stearamide, dimethylaminoethyl stearamide, dimethylaminopropyl stearamide, diethylaminoethyl stearamide, diethylaminopropyl stearamide, aminoethyl eicosanamide, aminopropyl eicosanamide, dimethylaminoethyl eicosanamide, dimethylaminopropyl eicosanamide, diethylaminoethyl eicosanamide and diethylaminopropyl eicosanamide.

8. The oil-in-water aqueous emulsion composition of an organopolysiloxane compound as claimed in claim 7 in which the fatty acid amidoamine compound as the component (B) is selected from the group consisting of dimethylaminoethyl stearamide, dimethylaminopropyl stearamide, diethylaminoethyl stearamide and diethylaminopropyl stearamide.

9. The oil-in-water aqueous emulsion composition of an organopolysiloxane compound as claimed in claim 1 in which the amino acid is selected from the group consisting of aspartic acid, glutamic acid, alanine and serine.

10. The oil-in-water aqueous emulsion composition of an organopolysiloxane compound as claimed in claim 1 in which the molar ratio of the amount of the component (B) to the amount of the component (C) is in the range from 1:5 to 5:1.

11. The oil-in-water aqueous emulsion composition of an organopolysiloxane compound as claimed in claim 1 in which the subscript b in the average unit formula expressing the component (D) is a positive number in the range from 1.2 to 2.3.

12. The oil-in-water aqueous emulsion composition of an organopolysiloxane compound as claimed in claim 1 in which the subscript c in the average unit formula expressing the component (D) is a positive number in the range from 0.01 to 1.0.

13. The oil-in-water aqueous emulsion composition of an organopolysiloxane compound as claimed in claim 1 in which the subscript d in the formula representing the group $R^5$ in the average unit formula expressing the component (D) is a positive integer in the range from 3 to 12.

14. The oil-in-water aqueous emulsion composition of an organopolysiloxane compound as claimed in claim 1 in which the subscript e in the formula representing the group $R^5$ in the average unit formula expressing the component (D) is a positive integer.

15. The oil-in-water aqueous emulsion composition of an organopolysiloxane compound as claimed in claim 1 in which the subscript e in the formula representing the group $R^5$ in the average unit formula expressing the component (D) is not smaller than the subscript f in the general formula.

16. The oil-in-water aqueous emulsion composition of an organopolysiloxane compound as claimed in claim 1 in which the polyoxyalkkylene-modified organopolysiloxane as the component (D) has an HLB value of 7 or higher and has such surface activity that a 0.1% by weight aqueous solution thereof has a surface tension not exceeding 30 mN/m at 25° C.

17. A method for the preparation of an oil-in-water aqueous emulsion composition of an organopolysiloxane compound as defined in claim 1 which comprises the steps of:
   (a) mixing together 100 parts by weight of the component (A), from 0.1 to 10 parts by weight of the component (B), from 0.05 to 5 parts by weight of the component (C), from 0.05 to 10 parts by weight of the component (D) and from 1 to 20 parts by weight of water as a part of the component (E), each of the components (A) to (E) having the same meaning as defined in claim 1, under agitation to form a water-in-oil emulsion; and
   (b) further agitating the water-in-oil emulsion to effect phase inversion thereof into an oil-in-water emulsion.

18. An oil-in-water aqueous emulsion composition of an organopolysiloxane compound which comprises:
   100 parts by weight of a combination consisting of
   (A) from 10 to 90% by weight of a first organopolysiloxane compound having a viscosity of at least 10,000 mm²/s at 25° C. and expressed by the average unit formula $R^1{}_a SiO_{(4-a)/2}$, in which the groups denoted by $R^1$ are, each independently from the others, a monovalent hydrocarbon group having 1 to 20 carbon atoms and the subscript a is a positive number in the range from 1.8 to 2.2, and (A1) from 90 to 50% by weight of a second organopolysiloxane compound having a viscosity in the range from 2 to 1000 mm²/s a 25° C. and expressed by the average unit formula $R^1{}_{a'} SiO_{(4-a')/2}$, in which $R^1$ has the same meaning as defined for the component (A) and the subscript a' is a positive number in the range from 1.8 to 2.2;
   (B) from 0.1 to 10 parts by weight of a fatty acid amidoamine compound represented by the formula $R^3-CO-NR^4-(CH_2)_m-NR^4{}_2$, in which $R^3$ is a monovalent hydrocarbon group having 15 to 19 carbon atoms, each $R^4$ is, independently from the others, a hydrogen atom or a monovalent hydrocarbon group having 1 to 5 carbon atoms and the subscript m is a positive integer of 2, 3 or 4;
   (C) from 0.05 to 5 parts by weight of an amino acid;
   (D) from 0.05 to 10 parts by weight of a polyoxyalkylene-modified organopolysiloxane compound having a molecular weight not exceeding 3000 and expressed by the average unit formula $R^2{}_b R^5{}_c SiO_{(4-b-c)/2}$, in which the groups denoted by $R^2$ are, each independently from the others, a monovalent hydrocarbon group having 1 to 20 carbon atoms, the groups denoted by $R^5$ are, each independently from the others, a polyoxyalkylene-substituted alkyl group of the formula $-(C_d H_{2d})-O-(C_2 H_4 O)_e-(C_3 H_6 O)_f-R^6$, $R^6$ being a hydrogen atom, a monovalent hydrocarbon group having 1 to 20 carbon atoms or an acyl group having 2 to 20 carbon atoms, the subscript d being a positive integer of 2 to 15, the subscript e being a positive integer of at least 3 and the subscript f being 0 or a positive integer, the subscript b is a positive number in the range from 1.0 to 2.5 and the subscript c is a positive number in the range from 0.005 to 1.2 with the proviso that b+c is in the range from 1.5 to 2.8; and
   (E) from 10 to 300 parts by weight of water as a dispersion medium of the components (A) to (D);
   wherein components (B) and (C) together form at least some fatty acid amidoamine-amino acid salt, and
   wherein droplets in the emulsion have an average diameter in the range from 0.5 to 20 μm.

19. The oil-in-water aqueous emulsion composition of an organopolysiloxane compound as claimed in claim 18 in which the second organopolysiloxane as the component (A1) has a viscosity in the range from 10 to 500 mm²/s at 25° C.

* * * * *

UNITED STATES PATENT AND TRADEMARK OFFICE
CERTIFICATE OF CORRECTION

PATENT NO. : 6,316,545 B1
DATED : November 13, 2001
INVENTOR(S) : Koji Skuta

It is certified that error appears in the above-identified patent and that said Letters Patent is hereby corrected as shown below:

Column 15,
Line 25, after "integer" insert -- of at least 5 --.

Signed and Sealed this

Thirteenth Day of August, 2002

*Attest:*

*Attesting Officer*

JAMES E. ROGAN
*Director of the United States Patent and Trademark Office*